United States Patent
Pradhan et al.

(10) Patent No.: US 8,510,449 B1
(45) Date of Patent: Aug. 13, 2013

(54) CACHING OF DATA REQUESTS IN SESSION-BASED ENVIRONMENT

(75) Inventors: Gyanendra D. Pradhan, Campbell, CA (US); Roger W. Cox, Los Altos, CA (US); Garrett R. Mueller, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 1986 days.

(21) Appl. No.: 11/117,950

(22) Filed: Apr. 29, 2005

(51) Int. Cl.
*G06F 15/16* (2006.01)

(52) U.S. Cl.
USPC ........................................ 709/227

(58) Field of Classification Search
USPC ............... 709/227, 230, 232; 395/200.57, 395/200.6; 71/3, 6, 113, 118, 120, 121, 122, 71/123, 125, 126, 129, 130, 131, 132, 135, 71/138, 140, 144
See application file for complete search history.

(56) References Cited

U.S. PATENT DOCUMENTS

| | | | |
|---|---|---|---|
| 5,537,533 A * | 7/1996 | Staheli et al. | 714/5 |
| 5,964,886 A * | 10/1999 | Slaughter et al. | 714/4 |
| 6,370,614 B1 * | 4/2002 | Teoman et al. | 711/113 |
| 6,691,165 B1 * | 2/2004 | Bruck et al. | 709/227 |
| 6,728,747 B1 * | 4/2004 | Jenkins et al. | 718/101 |
| 6,732,237 B1 * | 5/2004 | Jacobs et al. | 711/119 |
| 6,757,695 B1 * | 6/2004 | Noveck et al. | 707/200 |
| 6,904,433 B2 * | 6/2005 | Kapitskaia et al. | 707/10 |
| 7,187,931 B2 * | 3/2007 | Trossen | 455/440 |
| 7,194,761 B1 * | 3/2007 | Champagne | 726/6 |
| 7,523,286 B2 * | 4/2009 | Ramany et al. | 711/170 |
| 2002/0099829 A1 * | 7/2002 | Richards et al. | 709/227 |
| 2004/0078638 A1 * | 4/2004 | Cochran | 714/6 |
| 2004/0133650 A1 * | 7/2004 | Miloushev et al. | 709/213 |
| 2004/0215746 A1 * | 10/2004 | McCanne et al. | 709/219 |
| 2008/0168229 A1 * | 7/2008 | Beelen et al. | 711/118 |

* cited by examiner

*Primary Examiner* — John MacIlwinen
(74) *Attorney, Agent, or Firm* — Blakely, Sokoloff, Taylor & Zafman LLP

(57) ABSTRACT

Caching of data requests in session-based environment. An embodiment of a method includes a client preparing a data request for a storage server in a session-based environment. The prepared data request is transmitted from the client to the storage server. The data request is stored in a cache memory for the client via a protocol for the session-based environment.

16 Claims, 6 Drawing Sheets

CACHING OF DATA REQUESTS IN SESSION-BASED ENVIRONMENT

FIELD OF THE INVENTION

At least one embodiment of the present invention pertains to data storage, and more particularly, to a method and apparatus for caching data requests in a session-based environment.

BACKGROUND

A storage server is a special-purpose processing system used to store and retrieve data on behalf of one or more client processing systems ("clients"). A file server is an example of a storage server. A file server operates on behalf of one or more clients to store and manage shared files in a set of mass storage devices, such as magnetic or optical storage based disks or tapes. The mass storage devices may be organized into one or more groups of Redundant Array of Inexpensive Disks (RAID). In a storage area network (SAN), a storage server can provide clients with block-level access to stored data, rather than file-level access. Some storage servers are capable of providing clients with both file-level access and block-level access, such as certain Filers produced by Network Appliance, Inc. of Sunnyvale, Calif.

Multiple storage servers may be combined together, such as in a cluster. A cluster may be used to protect operations by providing continued service if a storage device fails or requires maintenance or upgrade. In one example, when a client makes a data request to a storage server in a session-based environment, the storage server will generally respond with an acknowledgement (or "ACK") signal. When a server has failed or is otherwise unavailable, no ACK message will be sent. If the client does not receive an ACK signal, the client will become aware that a problem exists and may resend the request or take other action. Another server may replace the original server, and the request can be resent to the replacement server.

However, if a storage server receives a request, sends an ACK signal, and then fails before completing the request, the client will expect the data to be forthcoming and will not resend the request. In a session-based environment, the data request may then be irretrievable. A replacement server may take over for the original failed server, and the replacement server can then request that any pending request be resent, but the data request may no longer be available.

SUMMARY OF THE INVENTION

An embodiment of the invention provides for caching of data requests in a session-based environment.

An embodiment of a method includes a client preparing a data request for a storage server in a session-based environment. The prepared data request is transmitted from the client to the storage server. The data request is stored in a cache memory for the client via a protocol for the session-based environment.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
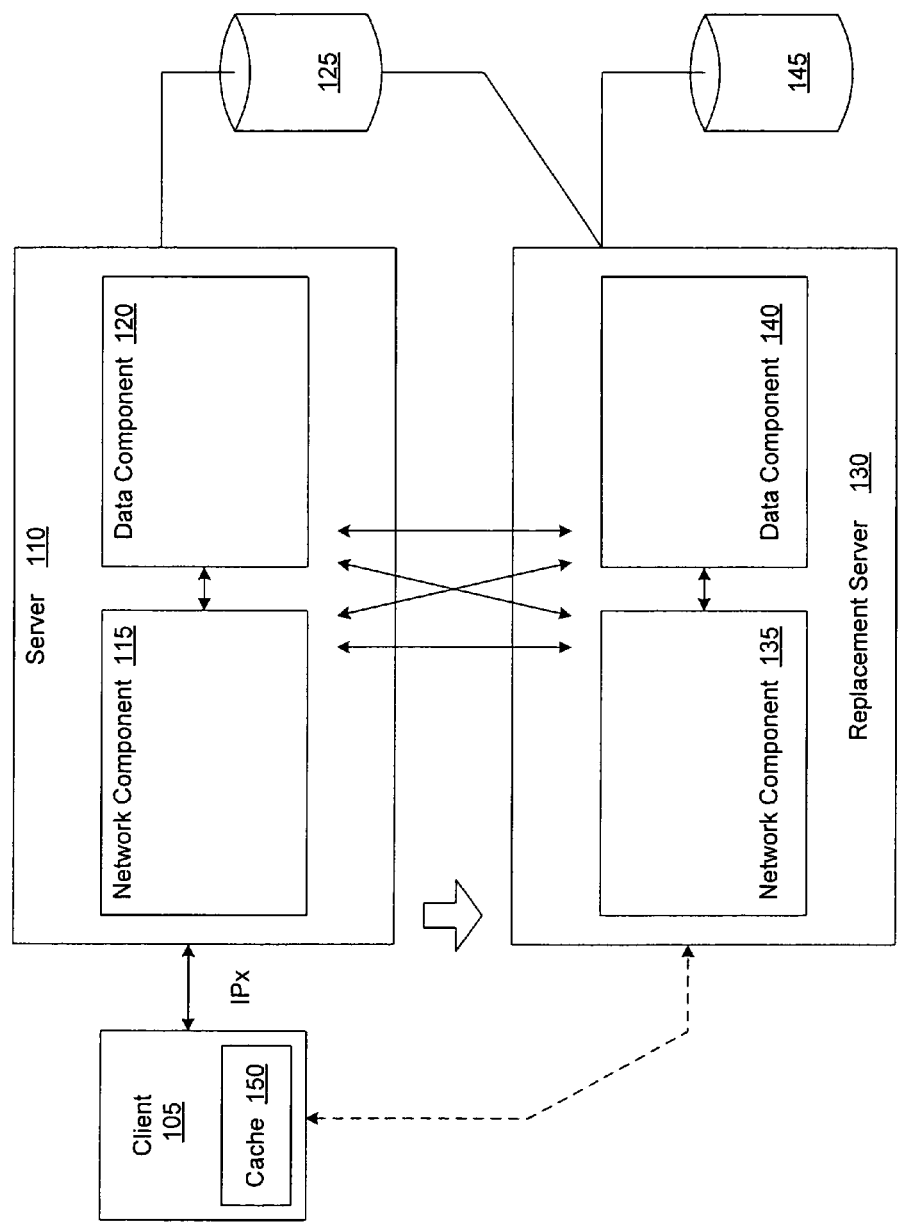
FIG. 1 illustrates an embodiment of caching of data requests.

A method and apparatus is disclosed for caching of data requests in a session-based environment.

In one embodiment of the invention, a data request from a client to a storage server in a session-based environment is cached. The data request is available in the cache if the storage server or a server component fails or is otherwise replaced. If a storage server or server component fails or otherwise becomes unavailable after acknowledgement of the data request, the replacement server can request that the client resend any uncompleted data requests. The client can then obtain the request from the cache.

As used herein, a "session" is a lasting or persistent connection between two entities, such as a client and a server. A session may include multiple interactions between the entities during the existence of the connection. A "session-based environment" is a communication environment in which entities exchange information through session communications.

In one embodiment of the invention, a system in a session-based environment transfers data using a file sharing protocol such as CIFS (Common Internet File System) protocol, developed by Microsoft that evolved from SMB (Server Message Block). In such a session-based environment, a request that is sent from a client to the storage server is not generally available after an acknowledgement signal has been received. For this reason, a system is vulnerable to data loss if a server fails after making an acknowledgement of a data request. In some environments, a server may store data in non-volatile memory (such as non-volatile random access memory, or NVRAM), but the storage may not be accessible and may occur quickly enough in a server failure to prevent the loss of data.

In an embodiment of the invention, a CIFS client has the ability to continue operation in the case of server failure by maintaining data requests that could otherwise be lost. In an environment that includes CIFS protocol for file sharing, an operating system for a client has a protocol software layer on top of a network software layer. The protocol layer includes a CIFS layer running on top of a TCP (Transfer Control Protocol) layer. The network layer may include a system such as Ethernet. In conventional operations, an issue may arise regarding the relationship between the TCP layer and the CIFS layer. TCP may be relied upon to guarantee delivery of messaging, but CIFS does not provide sufficient end-to-end reliability features for this purposes. In such environment, another software layer or module can be inserted in the protocol software layer. CIFS enables the insertion of software layers between the CIFS and TCP layers. In one embodiment of the invention, a cache layer is inserted between the CIFS layer and the TCP layer in the system protocol. In an embodiment of the invention, the session-based protocol is used to support a data request cache mechanism. A data request made by a client will pass through the protocol layer, including the cache module. The cache module then will cache outgoing data requests if directed by the server, thereby enabling retrieval of such requests when needed. The data request is retained in a cache at least until a response to the data request is received by the client.

In one example, a client is in a session with a server, wherein the session includes the use of CIFS protocol. In this example, the client sends a data request to the server. The data request is accessed by a cache module included in a protocol of the client, such as the data request passing through a cache layer between a CIFS software layer and a TCP software layer. The cache layer provides for caching the data request, which is stored in a memory or register. The server receives the data request and returns an acknowledgement. The client receives the acknowledgment. However, in this instance the server then fails before completing the request or sending a response to the client. For this reason, the server does not provide the requested data to the client.

In this example, the server may then be replaced by another server or by multiple other servers. A replacement server has access to the data storage that was accessed by the original server and thus can respond to data requests of the client. The process of replacing the server may vary and is not important for purposes of understanding the invention. In an embodiment of the invention, the replacement of the server is non-disruptive, and the session that exists with the client is transferred from the server to the replacement server. Upon replacing the server, the replacement server may, among other actions, attempt to respond to existing data requests for the client. To address such requests, the replacement server may send a message to the client, the message requesting that the client resend any requests that have not been completed. In conventional operation, the data request would no longer be available. In an embodiment of the invention, however, the client will search the cache used for data requests in response to the message from the replacement server. The cache will retain the data request at least until a response to the data request is received. If an uncompleted data request is stored, the client can act to provide the request to the replacement server. In this example, the client retransmits the data request. The replacement server will receive the retransmitted request. The replacement server then can address the data request by sending an acknowledgement to the client, retrieving the data from data storage, and transmitting the data to the client.

FIG. 1 illustrates an embodiment of caching of data requests. In this illustration, a client 105 communicates with a storage server 110. The client 105 may communicate with the server 110 over a network, which is not illustrated in this figure. The storage server 110 then is coupled with a data storage 125. The structure of the storage server may vary. A storage server may have single unit or component, or may include multiple components. The components may have various functions and operations, depending on the particular server configuration. In one example the storage server includes a network component 115 (a network blade, or N-blade) for communication with the client and a data component 120 (a data blade, or D-blade) for communication with the data storage 125. In one example, the network component 115 and the data component 120 are together as a unit, such as in a box or cabinet. However, this arrangement is not necessary. A cluster may include multiple N-blades and multiple D-blades, with any of the D-blades communicating with any of the N-blades.

The storage server 110 may require replacement, which may be temporary or permanent. In order to continue operations and not disrupt the session with the client, the operations of the server 110 may be transferred to one or more replacement servers, such as a replacement server 130. In this example, the replacement server also includes a network component 135 and a data component 140, and is coupled with a data storage 145. The replacement server 130 is also coupled with the data storage 125 of the original storage server 110 and thus can substitute for the operations of the original storage server 110.

In an embodiment of the invention, the client 105 includes a cache 150 for the storage of data requests of the client. The cache storage may exist in essentially any form. The cache 150 will include a memory or register to hold data requests, and may be a separate device or may be a portion or sector of a memory device that serves other purposes. In one embodiment, a cache module or software layer is responsible for the operation of the cache, the session-based protocol supporting a cache mechanism. A data request from the client 105 to the server 110 is cached. In an embodiment of the invention, the cache 150 retains the data request at least until the data request has been completed and the client has received a response to the request.

In one example, the storage server 110 fails and does not complete the data request. The operation of the storage server 110 is transferred to the replacement server 130. The replacement may be non-disruptive and continue the session with the client. The client 105 may not be aware of the change, or may not be aware of the change at certain software levels. The replacement may include the transfer of a network address from the storage server 110 to the replacement server 130. The replacement of the storage server 110 may occur gradually or in increments, depending on the replacement process. When the replacement server 130 is operational and takes over some or all operations of the storage server 110, then the replacement server 130 may notify the client 105. The notification may include a message requesting that all non-completed requests be retransmitted.

Upon receiving a request for retransmission of uncompleted data requests, the client 105 will examine the cache 150 to determine whether any uncompleted data requests exist. The client 105 will then retrieve the data request previously sent to the storage server 110 from the cache 150. The client then can retransmit the request to the replacement server. The replacement server 130 will receive the data request and then act upon the request by acknowledging the request, retrieving the needed data from the data storage 125, and returning the data to the client 105. Upon receiving the data response, the data request is removed from the cache 150. In one example, the data response will pass through the cache module of the protocol layer. The cache module will cause the removal of the data request from the cache 150.

Figure 2:
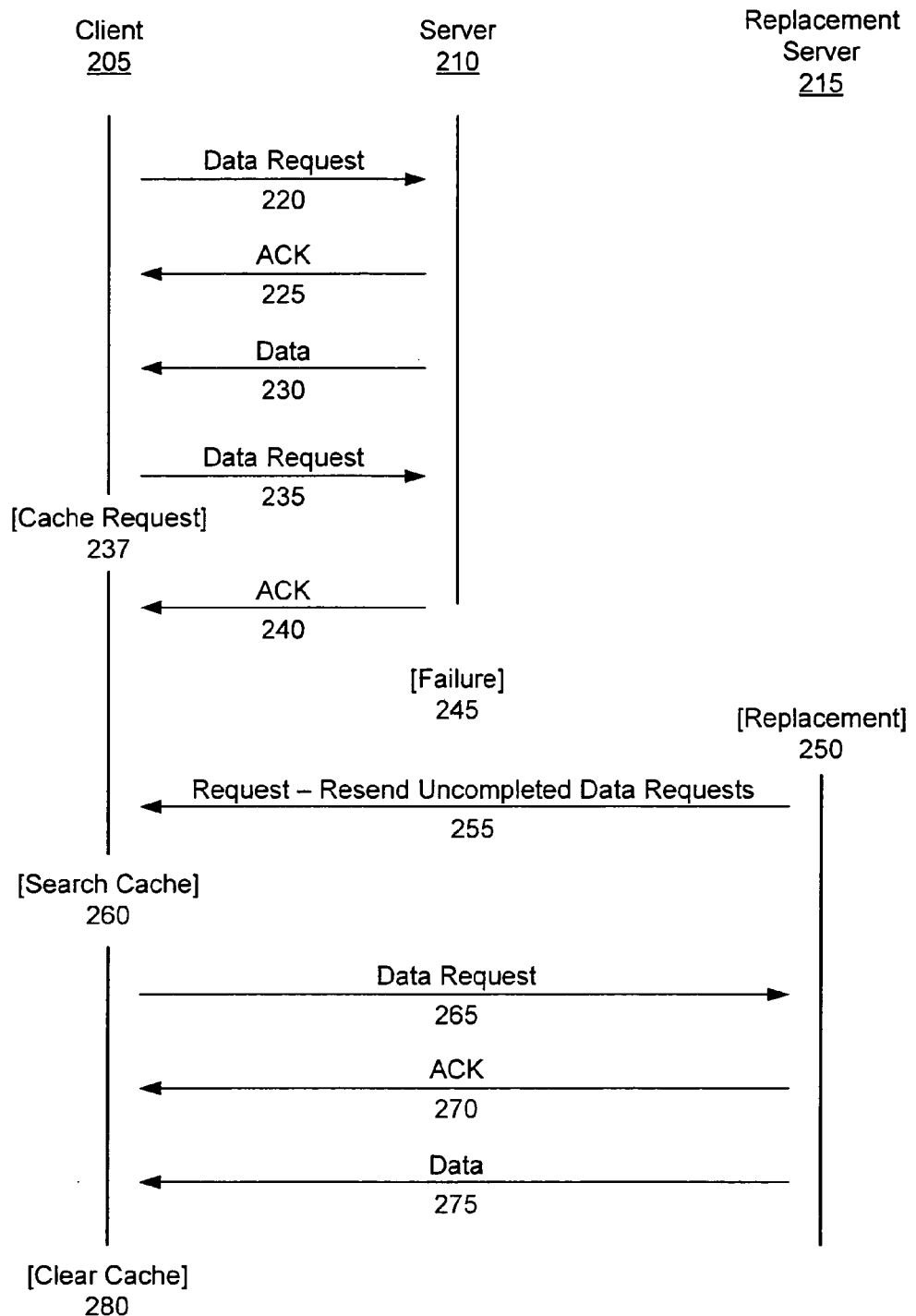
FIG. 2 is an illustration of commands for an embodiment of data request cache operation.

FIG. 2 is an illustration of commands for an embodiment of data request cache operation. In this illustration, a client 205 communicates with a server 210 in a session-based environment. The client 205 sends a data request to the server 210. In a normal operation, the server returns an acknowledgement of the request 225 and then returns the requested data 230. In certain instances, acknowledgement of a request may be delayed so that the acknowledgement can be included in the next batch of data sent to the client, if the next data to be sent is available soon enough for such purpose. In such instances, the acknowledgement 225 is included with other data that is sent from the server 210 to the client 205. If the acknowledgement had not been returned the server 210, the client would be aware of a problem. The client 205 could then retransmit the data request or take other action to address the failure of the server 210 to address the data request.

However, in another example a data request is made 235 by the client 205. In this process, the data request is placed in a cache 237. In an example, the protocol used in the session by the client 205 includes a cache software module. The cache module provides for caching any data requests made by the client 205 until such data requests are complete. In this case, an acknowledgement of the data request is returned 240 by the server 210. After sending the acknowledgement, the server 210 then suffers a failure 245, or otherwise become inoperative or requires replacement. Such failure has occurred after the acknowledgement has been sent, but before the response to the data request is completed. Upon the failure of the server 210, a replacement operation is conducted 250 and one or more replacement servers, such as replacement server 215, come on-line to handle the data operations for the original server 210. The replacement server 215 is able to access the data storage that was accessed by the server 210.

The replacement server 215 then takes over operations of the server. The operations of the replacement server may include transmitting a request to the client 205 asking for retransmission of all uncompleted data requests 255. Upon receiving the request for retransmission, the client 205 will search the cache 260, which holds any data requests until the data requests have been completed. The client 205 will retrieve the uncompleted data request from the cache and retransmit the request 265, which will be received by the replacement server 215. The replacement server 215 then will acknowledge the request 270 and return the requested data 275 to the client 205. The client 205 then clears the data request entry from the cache 280.

Figure 3:
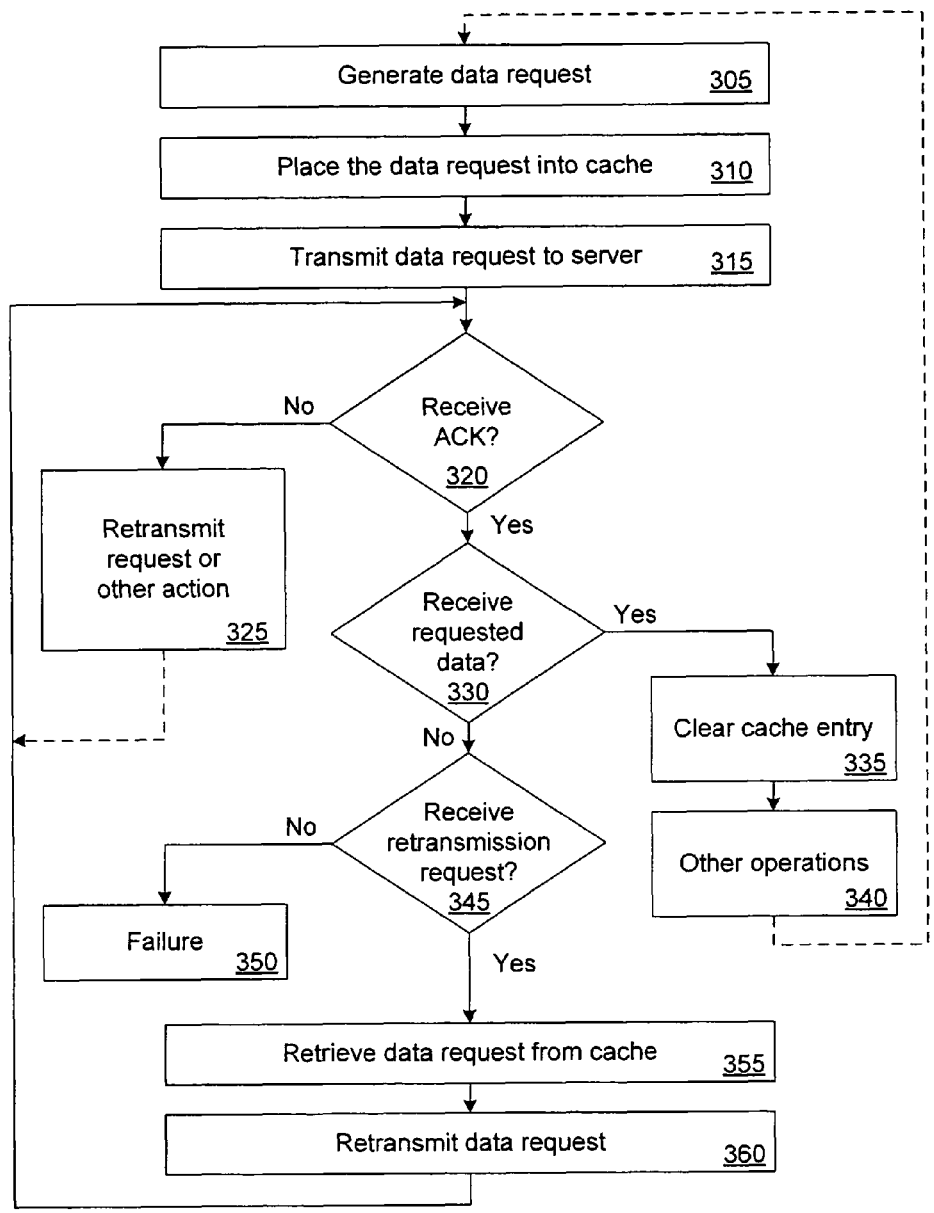
FIG. 3 is a flowchart to illustrate an embodiment of caching of data requests in a session-based environment.

FIG. 3 is a flowchart to illustrate an embodiment of caching of data requests in a session-based environment. In this illustration, a data request is generated 305. The request is placed in a cache 310. In a session-based environment, such as an environment using CIFS protocol for the exchange of files, a protocol software layer may include a cache layer or module that provides for the caching of data requests. The data request then is transmitted to a server 315. If an acknowledgement (ACK) is not received 320, then the request is retransmitted or other action is taken to respond to the failure 325. If the data request is retransmitted, then the process may return to waiting for an acknowledgement of the data request 320. If the ACK message from the server is received 320, then there is determination whether the data in response to the request is received 330. If so, then the cache entry for the data request is cleared 335 and other operations may occur 340, such as returning to the generation of data requests 305. If the requested data is not received, there may then be a determination whether a retransmission request is received 345. A retransmission request may be sent if the operations of the server have been transferred to a replacement server, which then contacts clients and requests that any uncompleted data requests be resent. If no retransmission request is sent, then there is a failure condition to resolve 350. If a retransmission request is received, then the data request is retrieved from the cache 355 and the data request is retransmitted 360 and received by the replacement server. The process would then return to waiting for an ACK signal 320 and receiving the requested data 330.

Figure 4:
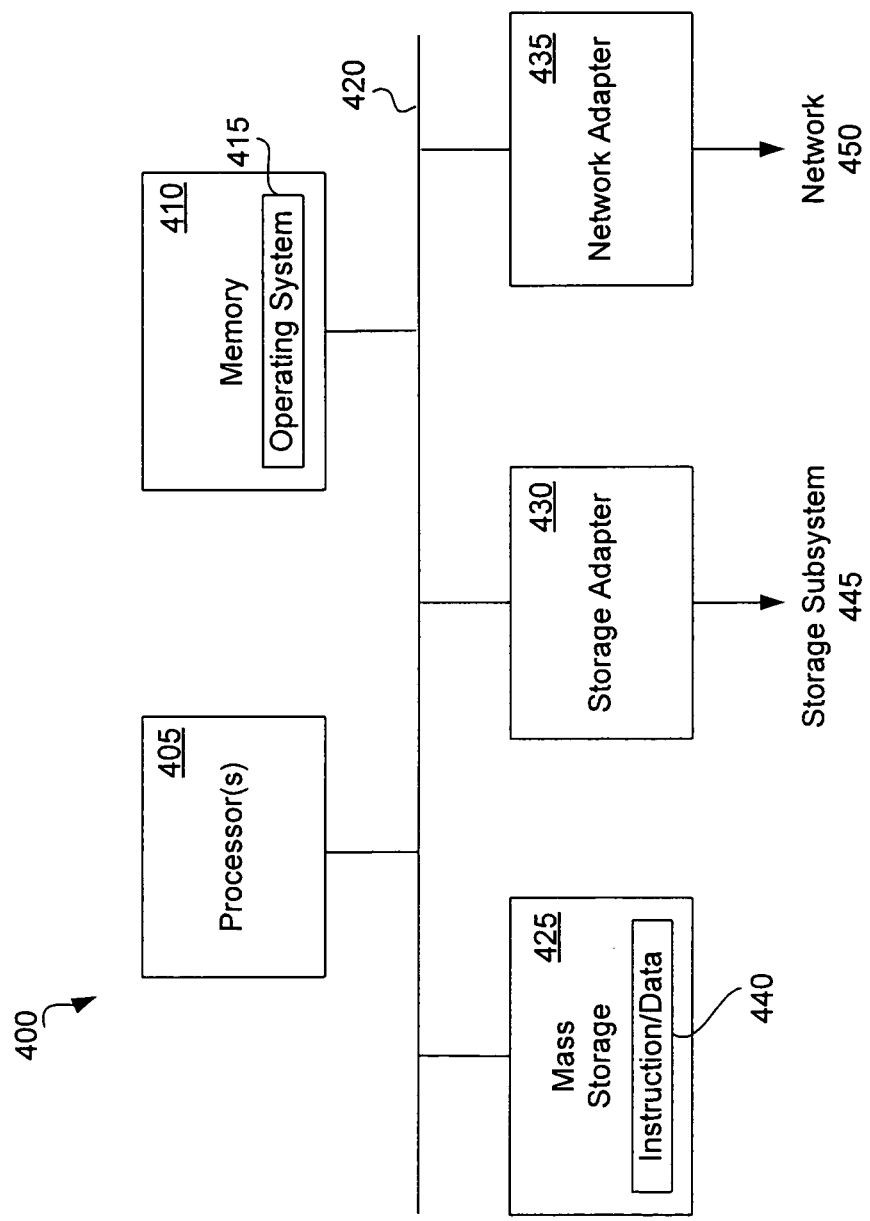
FIG. 4 is a block diagram illustrating an architecture of a computer system that may implement an embodiment of the invention.

FIG. 4 is a block diagram illustrating an architecture of a computer system that may implement an embodiment of the invention. The computer system may be or include a file server or a client system. Certain standard and well-known components that are not germane to the present invention may not be shown.

A computer system 400 includes one or more processors 405 and memory 410 coupled to a bus system 420. The bus system 420 shown in FIG. 4 is an abstraction that represents any one or more separate physical buses, point-to-point connections, or both connected by appropriate bridges, adapters, or controllers. The bus system 420, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements)

The processors 405 are the central processing units (CPUs) of the computer system 400 and, thus, control the overall operation of the computer system 400. In certain embodiments, the processors 405 accomplish this by executing software stored in memory 410. A processor 405 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 410 is or includes the main memory of the system 400. Memory 410 represents any form of random access memory (RAM), read-only memory (ROM), flash memory, or the like, or a combination of such devices. Memory 410 stores, among other things, the operating system 415 of the computer system 400. In an embodiment of the invention, the computer system 400 may operate in a session-based environment. In such environment, the operating system 415 may include appropriate protocol for the transfer of data, such as CIFS protocol for file sharing.

Also connected to the processors 405 through the bus system 420 are one or more internal mass storage devices 425. The system 400 may further include a storage adapter 430 and a network adapter 435. Internal mass storage devices 425 may include any conventional medium for storing large volumes of instructions and data 440 in a non-volatile manner, such as one or more magnetic or optical based disks. The storage adapter 430 allows a file server to access a storage subsystem 445 and may be, for example, a Fibre Channel adapter or a SCSI adapter. The network adapter 435 provides the system 400 with the ability to communicate with remote devices over a network 450 and may be, for example, an Ethernet adapter.

Figure 5:
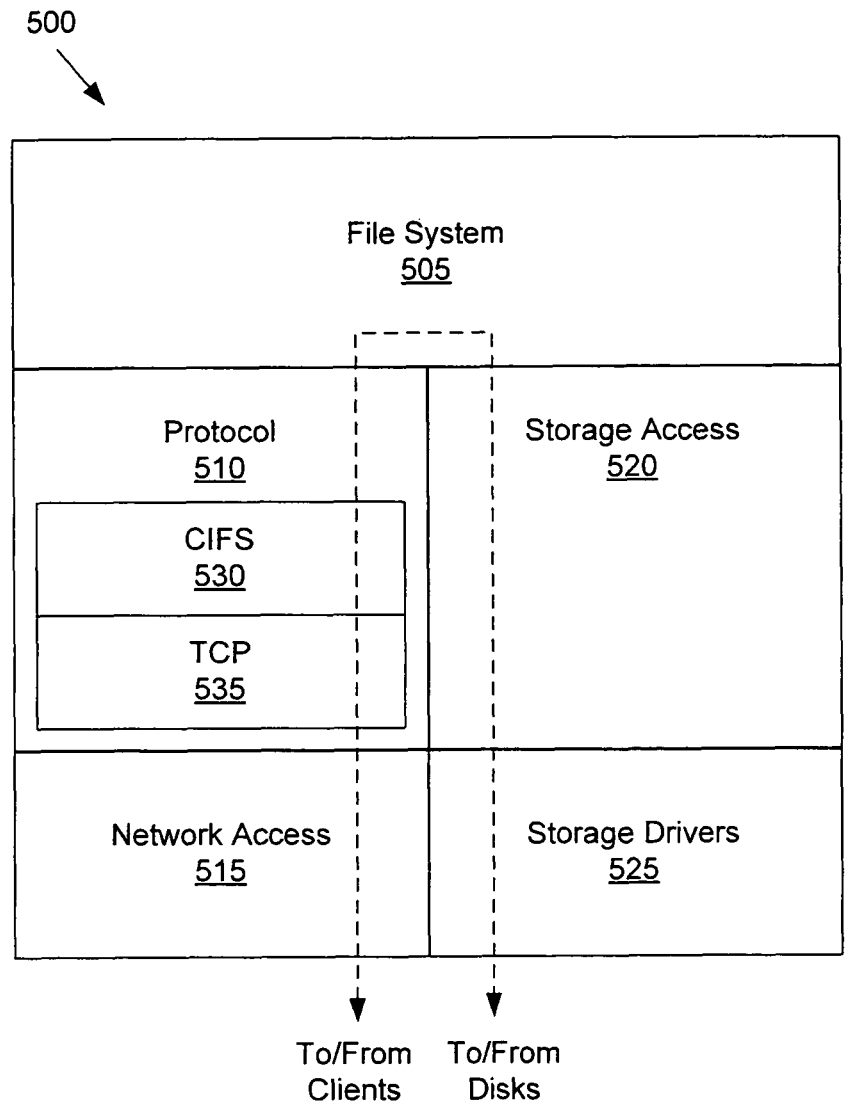
FIG. 5 illustrates an example of an operating system of a file server in an embodiment of the invention.

FIG. 5 illustrates an example of an operating system of a file server in an embodiment of the invention. As shown, an operating system 500 includes several modules, or "layers". These layers include a file system 505. The file system 505 is application-layer software that keeps track of the directory structure (hierarchy) of the data stored in a storage subsystem and manages read/write operations on the data (i.e., executes read/write operations on the disks in response to client requests). Logically "under" the file system 505, the operating system 500 also includes a protocol layer 510 and an associated network access layer 515, to allow a file server to communicate via a network, such in communication with clients.

The protocol 510 layer implements one or more of various higher-level network protocols, such as Network File System (NFS), Common Internet File System (CIFS), Hypertext Transfer Protocol (HTTP) and/or Transmission Control Protocol/Internet Protocol (TCP/IP). In one embodiment, the protocol layer 510 includes a CIFS protocol layer or module 530 running on top of a TCP protocol layer or module 535. The network access layer 515 includes one or more drivers that implement one or more lower-level protocols to communicate over the network, such as Ethernet.

Also logically under the file system 505, the operating system 500 includes a storage access layer 520 and an associated storage driver layer 525, to allow a file server to communicate with a storage subsystem. The storage access layer 520 implements a higher-level disk storage protocol, such as RAID, while the storage driver layer 525 implements a lower-level storage device access protocol, such as Fibre Channel Protocol (FCP) or SCSI. To facilitate description, it is henceforth assumed herein that the storage access layer 520 implements a RAID protocol, such as RAID-4 or RAID-DP™ (RAID double parity for data protection provided by Network Appliance, Inc.), and therefore may alternatively be referred to as RAID layer 520. Also shown in FIG. 5 is path 530 of data flow through the operating system 500 associated with a read or write operation.

Figure 6:
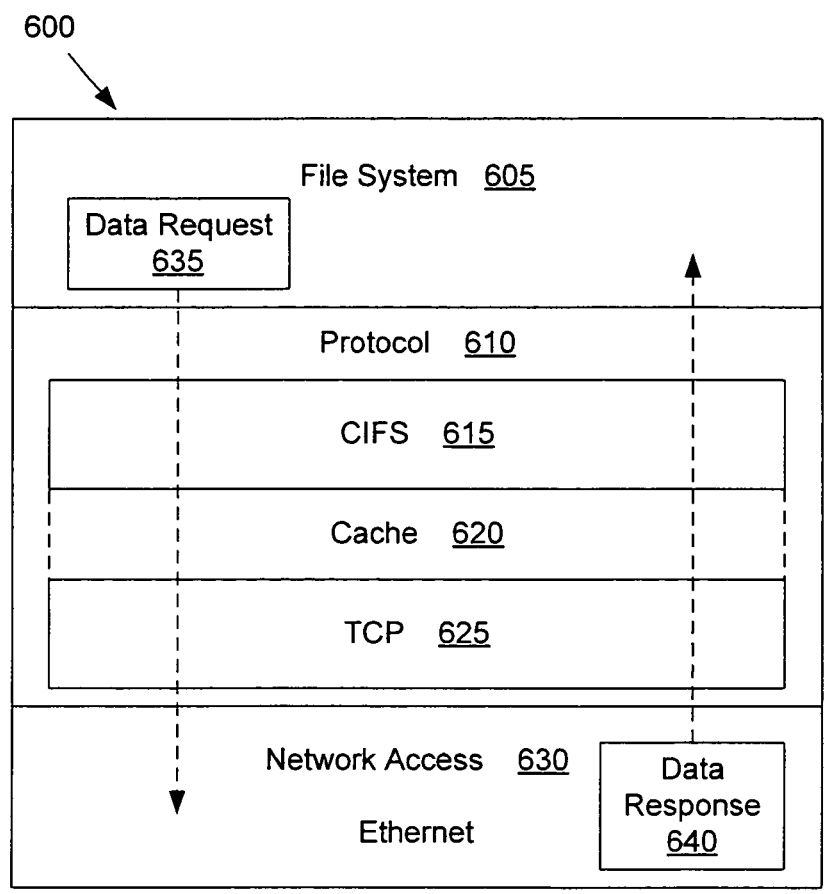
FIG. 6 shows an example of an operating system of a client according to an embodiment of the invention.

FIG. 6 illustrates an example of an operating system of a client according to an embodiment of the invention. In this illustration, a client operates in a session-based environment, engaging in a session with a storage server. As shown, an operating system 600 for a client also includes several modules or layers, including the file system 605, the protocol layer 610, and the network access layer 630. The protocol layer 610 and associated network access layer 630 enable the client to communicate via a network, such as in a session with a storage server.

The protocol layer 610 implements one or more higher-level network protocols. In one embodiment, the protocol layer 610 includes a CIFS protocol layer or module 615 running on top of a TCP protocol layer or module 625. The network access layer 630 includes one or more drivers that implement one or more lower-level protocols to communicate over the network, such as Ethernet.

In an embodiment of the invention, the capabilities of the CIFS protocol allow for the insertion of a cache layer or module 620 between the CFS layer 615 and the TCP layer 625. The cache layer 620 provides the ability to store data requests such that the recorded data requests may be retrieved if necessary. For example, a data request 635 is generated by the client and is transmitted to a storage server. The data request 635 passes through the cache layer, which then provides for storing the data request in a cache memory. If the storage server does not complete the data request 635 and the client thus does not receive a response, then the data request 635 can be retrieved from the cache by the cache layer 620. If a response to the data request 640 is received, then the cache layer 620 may note the arrival of the response 640 and may cause the data request to be removed from the cache.

Thus, a method and apparatus for caching of data requests in a session-based environment have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   in a client device, preparing a data request to a storage server in a session-based environment;
   transmitting the data request from the client device to the storage server;
   storing the data request in a cache memory in the client device via a protocol for the session-based environment, wherein the cache memory is controlled by a cache layer logically located between a Common Internet File System (CIFS) layer and a Transfer Control Protocol (TCP) layer in the protocol, and wherein the data request is cleared from the cache memory when completed;
   receiving, at the client device from a replacement storage server, a request to retransmit any uncompleted data request from the cache memory to the replacement storage server; and
   retrieving, by the client device, all uncompleted data requests remaining in the cache memory in response to the request to retransmit any uncompleted data request to the replacement storage server.

2. The method of claim 1, wherein transmitting the data request includes transferring the data request through a protocol software layer on the client device, the protocol layer including the cache layer.

3. The method of claim 1, further comprising receiving from the storage server an acknowledgment that the data request has been received prior to the request to retransmit the data request to a replacement storage server.

4. The method of claim 3, wherein the acknowledgment of receipt of the data request is received from the storage server and wherein the request to retransmit the data request to a replacement storage server is received from a replacement for the storage server.

5. The method of claim 1, further comprising retransmitting each uncompleted data request to the replacement storage server.

6. The method of claim 5, further comprising receiving a response to the data request and removing the data request from the cache.

7. A method comprising:
   receiving a data request from a client device at a storage server, the client device and the storage server communicating in a session;
   transmitting an acknowledgment of the data request from the storage server to the client device;
   upon a failure of the storage server, switching an operation of the storage server to a replacement storage server;
   transmitting, by the replacement storage server to the client device, a request to retransmit any uncompleted data request stored in a cache in the client device to the replacement storage server, wherein the cache is controlled by a cache layer logically located between a Common Internet File System (CIFS) layer and a Transfer Control Protocol (TCP) layer, and wherein data requests are stored in the cache when transmitted and cleared from the cache when completed; and
   receiving, by the replacement storage server, all uncompleted data requests remaining in the cache, wherein the data requests are retrieved from the cache in the client device.

8. The method of claim 7, wherein the operation of the cache is governed by a session protocol.

9. The method of claim 7, further comprising the replacement storage server acknowledging the data request, obtaining data in response to the data request, and transmitting the data to the client.

10. A storage system comprising:
    a first storage server coupled with a network in a session-based environment, the first storage server to engage in a session with a client device connected to the network, the client device having a cache within the client device for storage of data requests that are sent from the client device to the first storage server, the operation of the cache being directed by a protocol of the client device for the session-based environment, wherein the cache is controlled by a cache layer logically located between a Common Internet File System (CIFS) layer and a Transfer Control Protocol (TCP) layer in the protocol, and wherein the data requests are cleared from the cache when completed;

a data storage coupled with the first storage server, the first storage server to access the data storage in response to data requests; and a second storage server coupled with the network, the second storage server to replace the first storage server, wherein all uncompleted data requests are retrieved from the cache in response to a request, sent from the second storage server, for transmission of any uncompleted data request remaining in the cache memory to the second storage server.

11. A client system comprising:

a bus;

a network adapter coupled with the bus to provide connection to a network in a session-based environment;

a processor coupled with the bus; and an operating system for operation of the processor, the operating system including a data sharing protocol, the data sharing protocol including a cache module, the cache module to store a data request sent from the client system to a storage server in a cache until the data request is completed and to retrieve all uncompleted data requests from the cache module in response to a request from a replacement storage server, to transmit any uncompleted data request remaining in the cache to the replacement storage server, wherein the cache module is controlled by a cache layer logically located between a Common Internet File System (CIFS) layer and a Transfer Control Protocol (TCP) layer in the protocol.

12. The client system of claim 11, wherein the cache module retains the data request in the cache at least until a response to the data request is received.

13. The client system of claim 12, wherein the client system is to search the cache upon receiving a request to transmit the data request to the replacement storage server.

14. A non-transitory machine-readable storage medium having stored thereon data representing sequences of instructions that, when executed by a processor, cause the processor to perform operations comprising:

preparing a data request to a storage server, at a client device, in a session-based environment;

transmitting the data request from the client device to the storage server;

storing the data request in a cache memory in the client device in response to a protocol for the session-based environment, wherein the cache memory is controlled by a cache layer logically located between a Common Internet File System (CIFS) layer and a Transfer Control Protocol (TCP) layer in the protocol, and wherein the data request is cleared from the cache memory when completed;

retrieving all uncompleted data requests remaining in the cache memory in response to a request from a replacement storage server, to transmit any uncompleted data request from the cache memory to the replacement storage server; and transmitting the data request to the replacement storage server.

15. The non-transitory storage medium of claim 14, wherein transmitting the data request includes transferring the data request through a protocol software layer, the protocol layer including the cache layer.

16. The non-transitory storage medium of claim 14, wherein the sequences of instructions further include instructions that, when executed by a processor, cause the processor to perform operations comprising removing the data request from the cache upon receiving a response to the data request.

* * * * *